(12) United States Patent
Hullot et al.

(10) Patent No.: US 7,814,055 B2
(45) Date of Patent: Oct. 12, 2010

(54) METHOD OF MANAGING A CALENDAR AND A COMPUTER SYSTEM FOR IMPLEMENTING THAT METHOD

(75) Inventors: Jean-Marie Hullot, Boucival (FR); Bertrand Guiheneuf, Paris (FR); Laurent Cerveau, Paris (FR); Eric Noyau, Morsang (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 10/453,193

(22) Filed: Jun. 2, 2003

(65) Prior Publication Data

US 2004/0044646 A1 Mar. 4, 2004

Related U.S. Application Data (60) Provisional application No. 60/409,521, filed on Sep. 9, 2002.

(51) Int. Cl.
*G06F 17/30* (2006.01)
(52) U.S. Cl. ........................ 707/628; 707/620; 707/627; 715/963
(58) Field of Classification Search .................. 707/10, 707/201, 104.1; 705/9; 345/700, 963
See application file for complete search history.

(56) References Cited

U.S. PATENT DOCUMENTS

| | | | |
|---|---|---|---|
| 4,937,743 A | 6/1990 | Rassman et al. | |
| 5,129,057 A | 7/1992 | Strope et al. | |
| 5,247,438 A | 9/1993 | Subas et al. | |
| 5,323,314 A | 6/1994 | Baber et al. | |
| 5,371,844 A | 12/1994 | Andrew et al. | |
| 5,457,476 A * | 10/1995 | Jenson | 345/823 |
| 5,500,938 A * | 3/1996 | Cahill et al. | 345/856 |
| 5,528,745 A * | 6/1996 | King et al. | 345/753 |
| 5,619,637 A | 4/1997 | Henshaw et al. | |
| 5,621,458 A | 4/1997 | Mann et al. | 348/232 |
| 5,621,876 A | 4/1997 | Odam et al. | |
| 5,634,100 A | 5/1997 | Capps | |
| 5,659,768 A | 8/1997 | Forbes et al. | |
| 5,664,063 A | 9/1997 | Johnson et al. | 358/1.1 |

(Continued)

FOREIGN PATENT DOCUMENTS

| | | |
|---|---|---|
| EP | 0276427 A2 | 8/1988 |
| WO | WO 00/62146 A1 | 10/2000 |
| WO | WO 00/62201 A1 | 10/2000 |
| WO | WO 01/49051 A1 | 7/2001 |
| WO | WO 02/44958 A1 | 6/2002 |
| WO | WO 02/089026 A2 | 11/2002 |

OTHER PUBLICATIONS

Beard et al., "A Visual Calendar for Scheduling Group Meetings", Proceeding of the 1990 ACM Conference on Computer-supported cooperative work, 1990, pp. 279-290.*
TimeCruiser Computer Corporation, "Timecruiser User Guide", version 1.5, Jul. 1998, downloaded on Aug. 3, 2005 at http://www.atd.net/timecruiser/doc, pp. 1-50.*

(Continued)

*Primary Examiner*—Khanh B Pham
(74) *Attorney, Agent, or Firm*—Blakely, Sokoloff, Taylor & Zafman LLP (57) ABSTRACT

The current invention is about methods, systems and machine readable media for operating a calendar in a data processing system. In one exemplary method of managing said calendar, which contains at least one event, the method includes subscribing to said calendar which is available in an electronic format, downloading said calendar from a host electronic device to a subscriber electronic device, and storing said calendar in said electronic format to form a local calendar.

27 Claims, 11 Drawing Sheets

U.S. PATENT DOCUMENTS

| | | |
|---|---|---|
| 5,761,646 A | 6/1998 | Frid-Nielsen et al. |
| 5,805,163 A | 9/1998 | Bagnas |
| 5,838,889 A | 11/1998 | Booker |
| 5,842,009 A | 11/1998 | Borovoy et al. |
| 5,855,006 A * | 12/1998 | Huemoeller et al. ........... 705/9 |
| 5,860,067 A | 1/1999 | Onda et al. |
| 5,895,451 A * | 4/1999 | Yamade et al. ................. 705/8 |
| 5,899,979 A * | 5/1999 | Miller et al. ................... 705/9 |
| 5,920,313 A | 7/1999 | Diedrichsen et al. |
| 5,960,406 A * | 9/1999 | Rasansky et al. ............... 705/9 |
| 6,014,135 A | 1/2000 | Fernandes |
| 6,018,343 A | 1/2000 | Wang et al. |
| 6,039,355 A | 3/2000 | Durand |
| 6,064,975 A | 5/2000 | Moon et al. |
| 6,073,110 A | 6/2000 | Rhodes et al. |
| 6,085,166 A | 7/2000 | Beckhardt et al. .............. 705/9 |
| 6,101,480 A | 8/2000 | Conmy et al. |
| 6,167,379 A * | 12/2000 | Dean et al. ..................... 705/9 |
| 6,222,549 B1 | 4/2001 | Hoddie |
| 6,243,325 B1 | 6/2001 | Tomono |
| 6,272,074 B1 | 8/2001 | Winner |
| 6,278,456 B1 | 8/2001 | Wang et al. ................. 345/356 |
| 6,369,840 B1 * | 4/2002 | Barnett et al. ............... 345/853 |
| 6,380,959 B1 | 4/2002 | Wang et al. |
| 6,466,236 B1 | 10/2002 | Pivowar et al. |
| 6,486,894 B1 | 11/2002 | Abdelhadi et al. |
| 6,571,281 B1 | 5/2003 | Nickerson |
| 6,604,079 B1 | 8/2003 | Ruvolo et al. |
| 6,728,530 B1 * | 4/2004 | Heinonen et al. ........ 455/414.1 |
| 6,738,789 B2 | 5/2004 | Multer et al. |
| 6,760,728 B1 | 7/2004 | Osborn |
| 6,785,868 B1 * | 8/2004 | Raff ........................... 715/530 |
| 6,868,426 B1 | 3/2005 | Mankoff |
| 6,879,997 B1 | 4/2005 | Ketola et al. |
| 7,007,041 B2 | 2/2006 | Multer et al. |
| 7,039,596 B1 | 5/2006 | Lu |
| 7,082,402 B2 | 7/2006 | Conmy et al. |
| 7,096,232 B2 | 8/2006 | Doss et al. |
| 7,188,073 B1 | 3/2007 | Tam et al. |
| 7,233,933 B2 | 6/2007 | Horvitz et al. |
| 7,296,232 B1 | 11/2007 | Burdick et al. |
| 7,318,040 B2 | 1/2008 | Doss et al. |
| 7,334,000 B2 | 2/2008 | Chhatrapati et al. |
| 7,340,691 B2 | 3/2008 | Bassett et al. |
| 7,353,465 B2 | 4/2008 | Callaway et al. |
| 2001/0014867 A1 | 8/2001 | Conmy |
| 2001/0044805 A1 | 11/2001 | Multer et al. |
| 2001/0049617 A1 | 12/2001 | Berenson et al. |
| 2002/0010807 A1 | 1/2002 | Multer et al. |
| 2002/0040369 A1 | 4/2002 | Multer et al. |
| 2002/0131565 A1 * | 9/2002 | Scheuring et al. ........ 379/88.19 |
| 2002/0165753 A1 | 11/2002 | Worthington |
| 2002/0178060 A1 | 11/2002 | Sheehan |
| 2002/0184321 A1 * | 12/2002 | Fishman et al. ............. 709/206 |
| 2002/0188607 A1 | 12/2002 | Kogut-O'Connell et al. |
| 2002/0188620 A1 | 12/2002 | Doss et al. |
| 2002/0191035 A1 * | 12/2002 | Selent ........................ 345/866 |
| 2002/0196280 A1 * | 12/2002 | Bassett et al. ............... 345/751 |
| 2003/0045301 A1 | 3/2003 | Wollrab |
| 2003/0050986 A1 * | 3/2003 | Matthews et al. ........... 709/206 |
| 2003/0065677 A1 | 4/2003 | Culp et al. |
| 2003/0065742 A1 * | 4/2003 | Culp et al. .................. 709/218 |
| 2003/0129569 A1 | 7/2003 | Callaway et al. |
| 2003/0149606 A1 | 8/2003 | Cragun et al. |
| 2003/0154116 A1 | 8/2003 | Lofton |
| 2003/0163537 A1 | 8/2003 | Rohall et al. |
| 2003/0167664 A1 | 9/2003 | Mullinax |
| 2004/0039779 A1 | 2/2004 | Amstrong et al. |
| 2004/0073615 A1 | 4/2004 | Darling |
| 2004/0109025 A1 | 6/2004 | Hullot et al. |
| 2004/0122915 A1 | 6/2004 | Saare et al. |
| 2004/0125142 A1 | 7/2004 | Mock et al. |
| 2004/0172279 A1 | 9/2004 | Carolan et al. |
| 2004/0215572 A1 | 10/2004 | Uehara et al. |
| 2005/0125737 A1 | 6/2005 | Allen et al. |
| 2005/0222971 A1 | 10/2005 | Cary |
| 2006/0053043 A1 | 3/2006 | Clarke |
| 2006/0136241 A1 | 6/2006 | De Vries |
| 2008/0115088 A1 | 5/2008 | Frankel et al. |

OTHER PUBLICATIONS

F. Dawson and D. Stenerson: "Internet Calendaring and Scheduling Core Object Specification (iCalendar)", Network Working Group, Request for Comments: 2445, Nov. 1998.

B. Mahoney, G. Babics, A. Taler: "Guide to Internet Calendaring", Network Working Group, Request for Comments: 3283, Jun. 2002.

PCT International Search Report for PCT International Appln No. US03/28053, mailed Jun. 18, 2004 (5 pages).

PCT International Search Report for PCT International Appln No. US03/28247, mailed Feb. 13, 2004 (6 pages).

PCT Written Opinion for PCT International Appln. No. PCT/US03/28247. mailed Aug. 16, 2004 (5 pages).

PCT International Preliminary Examination Report for PCT International Appln No. US03/28247, mailed Feb. 25, 2005 (6 pages).

PCT Written Opinion for PCT International Appln No. US03/28053, mailed Sep. 16, 2004 (5 pages).

PCT International Preliminary Examination Report for PCT International Appln No. US03/28053, mailed Mar. 3, 2005 (6 pages).

Bisignano, Mario et al., "Expeerience: a Jxta middleware for mobile ad-hoc networks", Proceedings of the third International Conference on Peer-to-Peer Computing (P2P'03) 2003 IEEE, 2 pages.

Paluska, Justin Mazzola et al., "Footloose: A Case for Physical Eventual Consistency and Selective Conflict Resolution", Proceedings of the Fifth IEEE Workshop on Mobile Computing Systems & Applications (WMCSA 2003) 2003 IEEE, 10 pages.

Prasad, Sushil K. et al., "Enforcing Interdependencies and Executing Transactions Atomically Over Autonomous Mobile Data Stores Using SyD Link Technology", Proceedings of the 23rd International Conference on Distributed Computing Systems Workshops (ICDCSW'03) 2003 IEEE, 7 pages.

Prasad, Sushil K. et al., "Implementation of a Calendar Application Based on SyD Coordination Links", Proceedings of the International Parallel and Distributed Processing Symposium (IPDPS'03) 2003 IEEE, 8 pages.

PCT Notification of Transmittal of the International Search Report and Written Opinion of the International Searching Authority, or the Declaration, for the PCT Int'l. Appln. No. US2005/014619, mailed Sep. 2, 2005, (11 pages).

Supplementary European Search Report for EP Application No. 03794665.4, dated Aug. 30, 2006 (3 pages).

PCT International Preliminary Examination Report for PCT International Appln. No. US2005/014619, mailed Dec. 7, 2006 (7 pages).

VAitA, OsaSync Frequently Asked Questions, Feb. 4, 2004, http://web.archive.org/web/20040204195815/http://www.vaita.com/faq.asp.

WindowsITPro, Replying To and Forwarding Messages, Jun. 6, 2003 http://web.archive.org/web/20030625191716/http://www.windows-itlibrary.com/Content/191/11/2.html.

Mackinlay, Jock D. et al. "Developing Calendar Visualizers for the Information Visualizer," *ACM*, UIST'94, Nov. 2-4, 1994, pp. 109-118.

Silva, Sonia Fernandes et al. "Visualization of Linear Time-Oriented Data: a Survey,"IEEE 2000, pp. 310-319.

Carlis, John V. et al. "Interactive Visualization of Serial Periodic Data," Proceedings of the 11th annual ACM Symposium on User Interface Software and Technology (UIST '98) San Francisco, Nov. 1998, pp. 1-10.

Jonsson, Martin et al. "Achieving Non-Intrusive Environments for Local Collaboration,"The FUSE Research Group, Center for Wireless Systems, Kista, Sweden (2000), 14 pages.

Tullio, Joe et al. "Augmenting Shared Personal Calendars," Proceedings of the 15th annual ACM Symposium on User Interface Software and Technology (UIST '02), Paris, France, 4(2):11-20, Oct. 27-30, 2002.

* cited by examiner

METHOD OF MANAGING A CALENDAR AND A COMPUTER SYSTEM FOR IMPLEMENTING THAT METHOD

This application is related to and hereby claims the benefit of the filing date of U.S. Provisional Patent Application Ser. No. 60/409,521 filed Sep. 9, 2002, which application is hereby incorporated herein by reference.

The present invention relates to a method of managing a calendar and a computer system for implementing that method.

In the last fifty years, the pace of life and complexity for the consumer has increased considerably. Hitherto, many consumers merely required a simple manuscript diary or calendar to organise the various commitments and events occurring in their life. In due course, the complexity of life has necessitated improved organisation of the multitude of events occurring across many different areas of a consumers life. This has resulted in many instances of electronic devices being used with electronic calendar facilities provided.

A consumers life is typically demarcated by events occurring at work, those at home and those socially. Being advised of the various events and managing a calendar to organise those events is very difficult. To date, new events are often advised by manuscript publications or over the Internet. However, such new events need to be entered on the consumers chosen electronic calendar or each electronic calendar. Entering of those events is very time consuming, leads to errors and can easily overwhelm the ease of using the electronic calendar.

SUMMARY OF THE DESCRIPTION

Certain embodiments of the present invention relate to a method of managing a calendar, said calendar containing at least one event, said method comprising:
making available the calendar in an electronic format;
subscribing to said calendar;
downloading said calendar from a host electronic device to a subscriber electronic device; and
storing said calendar in said electronic format to form a local calendar.

Also the present invention provides a computer system having a host electronic device and at least one subscriber device and a computer program arranged for implementing such a method.

The foregoing method is facilitated, in one exemplary embodiment, through the use of a computer program operative on a computer such as one of the Macintosh personal computers from the applicant, Apple Computer Inc. of Cupertino, Calif., USA. More preferably the computer program is operative in the MacOS x version 10.2, known as Jaguar (Registered Trade Mark). Moreover, the computer program is complementary to Mail and Address Book computer applications also available from Apple for full personal information management. The computer program of this particular embodiment is compatible with printing applications and functions.

In addition, the computer program of this particular embodiment is compliant with standards for calendaring applications such as iCal and vCal (both Registered Trade Marks) and allows import of data from other applications like Entourage (Registered Trade Mark) available from Microsoft. Further details can be obtained from http://www.imc.org/draft-ietf-calsch-inetcal-guide. The computer program of this particular embodiment is also compatible with the iTools web service available from Apple in order to share calendar data easily over the Internet.

In view of the compatibility discussed above and in particular with the operating system, the computer program of this particular embodiment enables copy and paste with other applications, drag and drop facilities, use of the spellchecker, integration with email applications and integration with address applications for management of personal information.

Thus, the present invention provides, in certain embodiments, a method for enabling a user to publish his or her calendar to other users and the user can subscribe to other calendars thereby coordinating or managing events of one user with those of another.

BRIEF DESCRIPTION OF THE DRAWINGS

Embodiments of the present invention will now be described by way of further example only and with reference to the accompanying drawings, in which.

DETAILED DESCRIPTION

Embodiments of the present invention relate to calendar operations on a data processing system. A data processing system which may be used with embodiments of the invention typically include a display for displaying a calendar interface and a processor for controlling the display and an input device. Examples of such data processing systems include general purpose computers or special purpose computers or personal digital assistants or cellular telephones. Examples of data processing systems are shown and described in U.S. Pat. No. 6,222,549 which is hereby incorporated herein by reference. Often, the data processing system will include a memory for storing software (e.g. computer program) instructions. Embodiments of the invention may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device (addressable through a network). In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor of a data processing system.

A machine readable media can be used to store software and data which when executed by a data processing system causes the system to perform various methods of the present invention. This executable software and data may be stored in various places including for example ROM, volatile RAM, non-volatile memory and/or cache. Portions of this software and/or data may be stored in any one of these storage devices.

Thus, a machine readable media includes any mechanism that provides (i.e., stores and/or transmits) information in a form accessible by a machine (e.g. a computer, network device, personal digital assistant, manufacturing tool, any device with a set of one or more processors, etc.). For example, a machine readable media includes recordable/non-recordable media (e.g. read only memory (ROM); random access memory (RAM); magnetic disk storage media; optical storage media; flash memory devices; etc.) as well as electrical, optical, acoustical or other forms of propagated signals (e.g. carrier waves, infrared signals, digital signals, etc.); etc.

Figure 1:
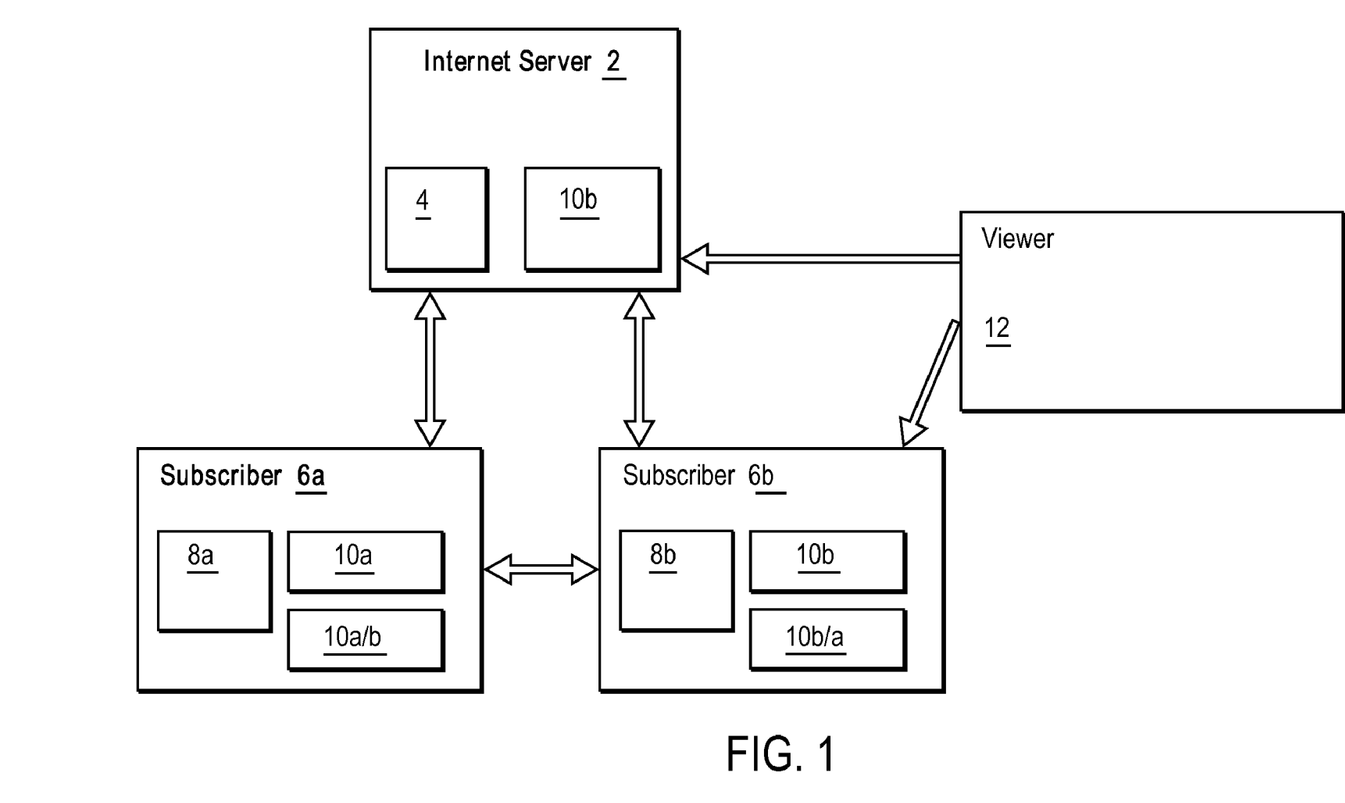
FIG. 1 is a schematic illustration of one embodiment of the present invention.

FIG. 1 relates to a first embodiment of the present invention. There is illustrated schematically a computer server 2 on which is stored a calendar 4 containing at least one event. A number of subscriber electronic devices 6a, 6b etc are each connected to the server 2. In the preferred embodiment, the computer server is provided over the Internet and the subscribers are computers connected intermittently to the server. Alternatively, the server could comprise a local area network to which the subscribers are connected permanently. The electronic devices could comprise any form of electronic device such as a notebook or laptop computer, personal digital assistant, mobile telephone, palm device etc.

The server 2 has stored thereon the calendar of events 4. The calendar 4 is downloaded and stored on each of the subscribers to form a local calendar 8a, 8b etc. The local calendar is stored in the same electronic format as on the server. The preferred embodiment enables the local calendar to be stored with a subscriber calendar 10a, 10b etc. In particular, the local calendar and the subscriber calendar both share the same user interface as described subsequently.

The present invention may also include a viewer electronic device 12. A viewer 12 may access the calendar stored on the server but may not download the same to form a local calendar. In order for a viewer to become a subscriber, the viewer may have to pay a subscriber fee.

A viewer electronic device may comprise any of the same subscriber electronic devices, for example a notebook or laptop computer, personal digital assistant, mobile telephone, palm device etc and be connected in any of the arrangements as discussed for a subscriber. Depending upon the electronic device involved any suitable electronic connection may be made as is well known in the art including USB, serial ports, firewire, bluetooth, infrared and over the Internet.

The preferred embodiment also enables a subscriber 6b to publish their local calendar 10b to the server 2 or for viewing by a viewer 12. Another subscriber, such as 6a may download the published local calendar 10b to form a local subscriber calendar 10a/b. The viewer may view the local calendar stored on the server 10b or directly if connected to the subscriber.

The subscribers may also be connected directly. In this case, a subscriber 6a may publish the local calendar 10a to the other subscriber 6b which is then stored to form a local subscriber calendar 10b/a stored on subscriber 6b.

The present invention provides for any number of calendars to be provided by the server or any number of electronic devices either subscriber or viewer to be included.

Figure 2:
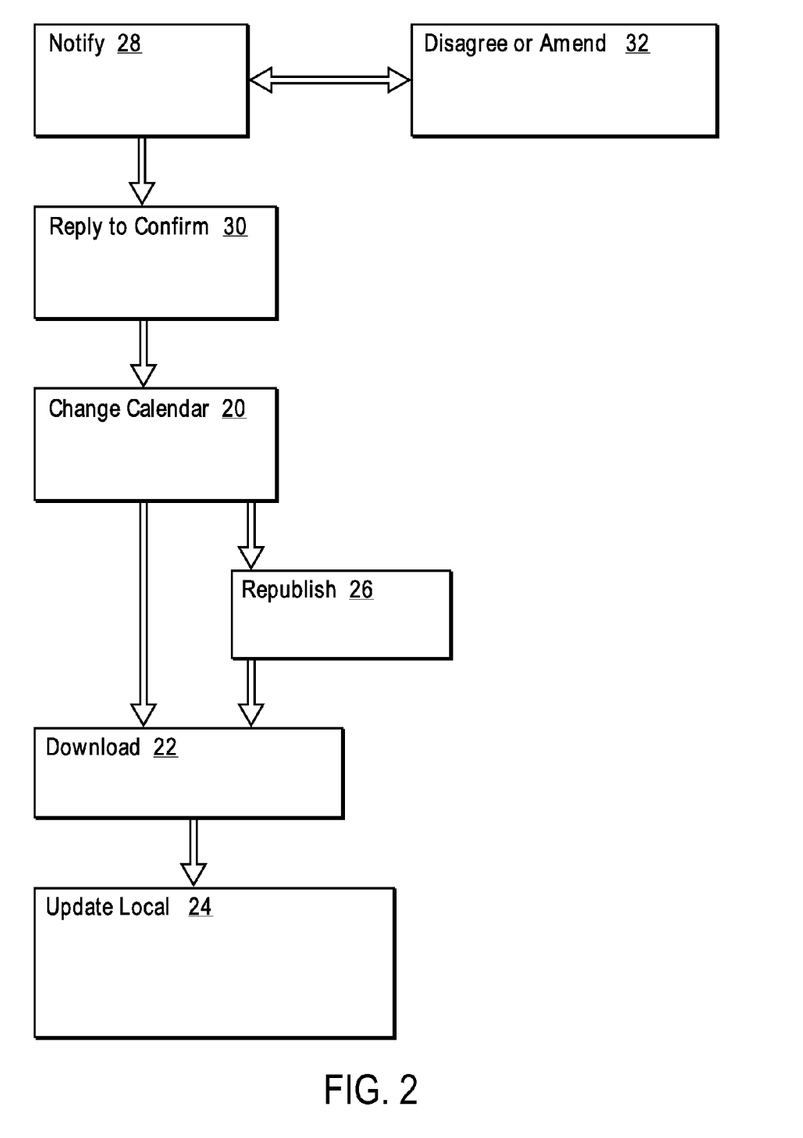
FIG. 2 is a schematic diagram of a flow chart for changing an event of a published calendar according to the present invention.

Many calendars are not static. Static calendars include those relating to national holidays, birthdays, daylight saving transition dates, tide data etc. However, many calendars are not static and events need to be added, modified or deleted. All of these are termed as changes. FIG. 2 illustrates schematically changes to be effected on a calendar which is published.

In the first instance a change may be made to a calendar in operation 20. If the change occurs on a calendar 4 stored on the server 2, then each subscriber 6a, 6b, downloads the change in operation 22 and the local calendar 8a, 8b is updated in operation 24. If the change occurs on a local calendar 10a stored on a subscriber, then the calendar, if sent directly to another subscriber 6b, is downloaded by the subscriber 6b and the local subscriber calendar 10b/a is updated. If the local calendar 10b is published on the server 2, then the local calendar 10b is republished in operation 26. The other subscriber 10a, downloads the republished calendar 10b and updates the local subscriber calendar 10a/b stored thereon.

The preferred embodiment also provides for a dialog between users operating the subscriber devices in order to confirm, disagree or amend any changes. A user of one of the subscribers may send a notification to the other subscriber in operation 28. The recipient subscriber may reply to confirm the change in operation 30. The change is then effected on the calendar and the change implemented on the local calendar as discussed above. The recipient subscriber may reply to disagree or amend the proposed change in operation 32. The subscriber and recipient may conduct this dialog between notifying 28 and replying 32 until a reply to confirm 30 is received. The change is then effected as discussed above.

The server or subscriber generating the calendar 4, 10a or 10b may provide for the recipient subscriber to view the calendar only or effect changes. Other preferences may be determined by the server or subscriber. Such preferences include the time period between making changes to the calendar and downloading those changes. Other preferences include merely notifying a user of a subscriber of a change. All such preferences are facilitated through the use of a user interface.

The present invention thus enables events from more than one calendar to be disseminated and organised in a method which is more manageable. In particular, events do not need to be re-entered onto the users electronic calendar thereby avoiding errors and the user can selectively choose events from certain calendars to be included in their local calendar. Moreover, the method provides for changes being effected and a dialog between at least two users for confirming on changes to be made.

The present invention of managing a calendar is particularly suited for implementation by a computer program comprising a plurality of calendars as described in our other co-pending U.S. patent application filed contemporaneously by the same inventors and entitled "A Computer Program Comprising A Plurality Of Calendars," U.S. patent application Ser. No. 10/453,234. For the sake of completeness, a description of this computer program is provided hereafter even though this other application is incorporated herein by reference.

Figure 3:
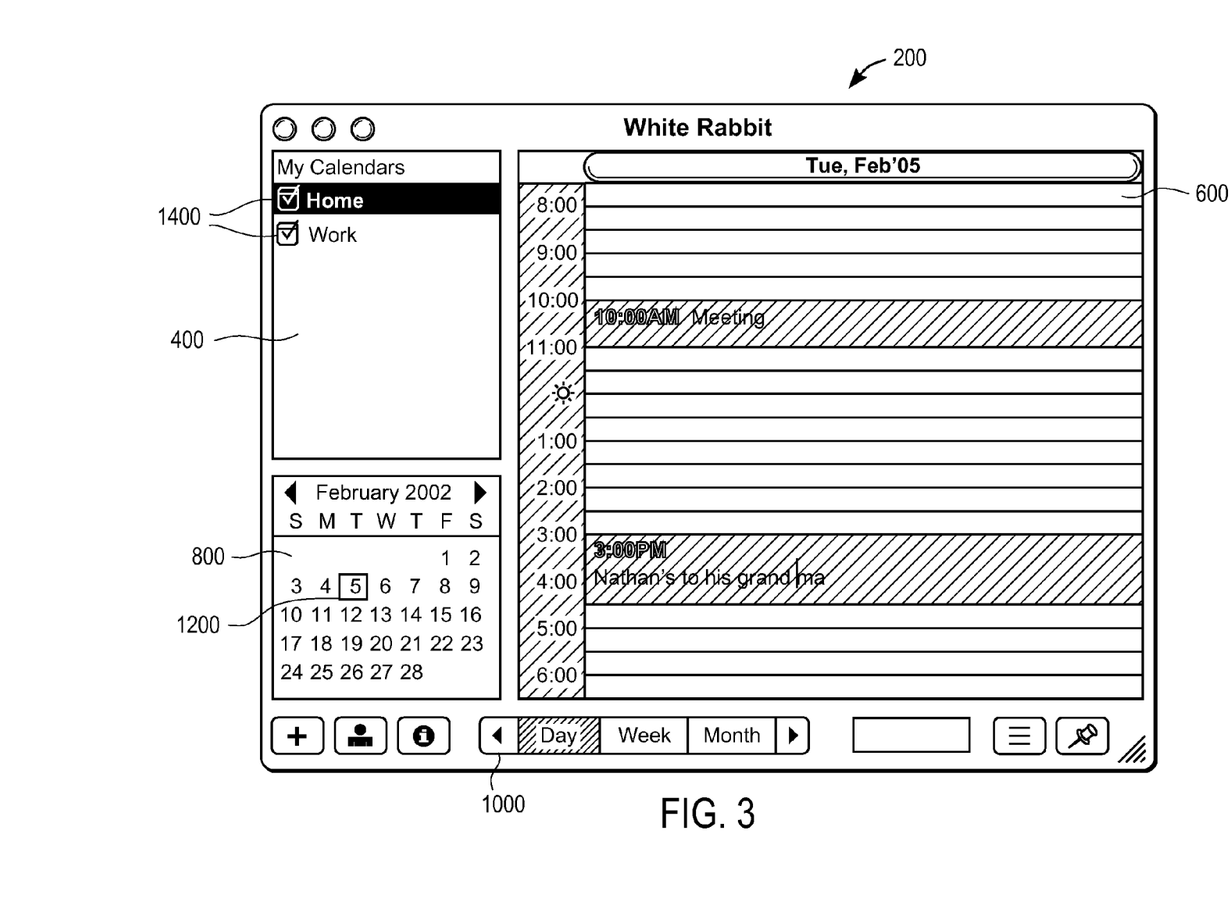
FIG. 3 is a diagram of a user interface according to the present invention.

The present invention includes a computer program having a user interface providing an interface for two or more calendars and the events from the two or more calendars may be selectively displayed simultaneously in a single calendar interface. FIG. 3 is a diagram of such a user interface 200. The user interface includes a number of windows 400, 600 and 800. Window 400 is titled "My Calendars". FIG. 3 illustrates the use of the user interface with two calendars, namely "Home" and "Work". The names of the calendars are displayed in the "My Calendars" window. Preferably, the calendars "Home" and "Work" are created by default. Other calendars may be included, especially public event calendars.

Figure 4:
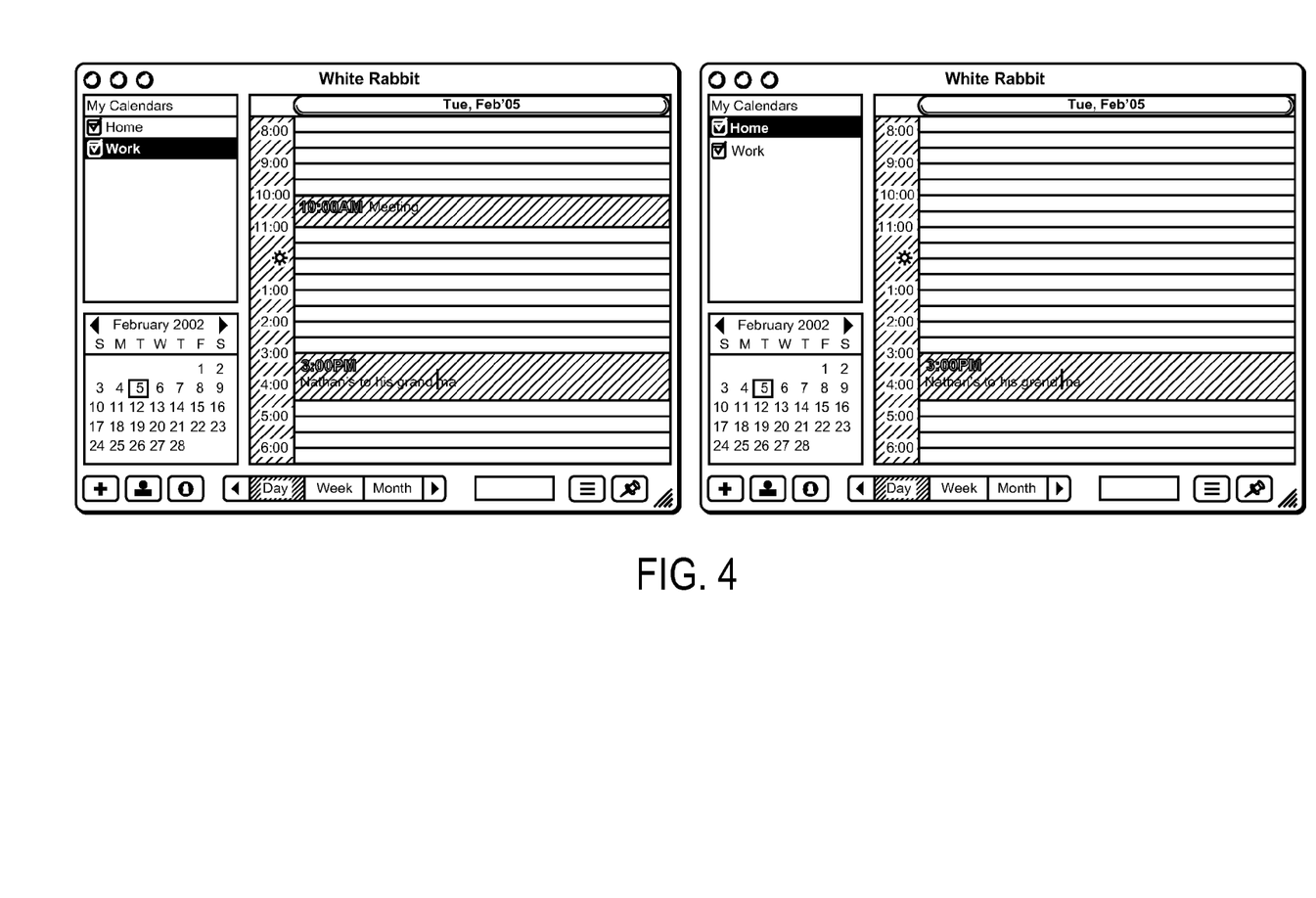
FIG. 4 is a diagram of the user interface according to the present invention illustrating two situations, one displaying events from two calendars and the other displaying events from only one calendar.
Figure 5:
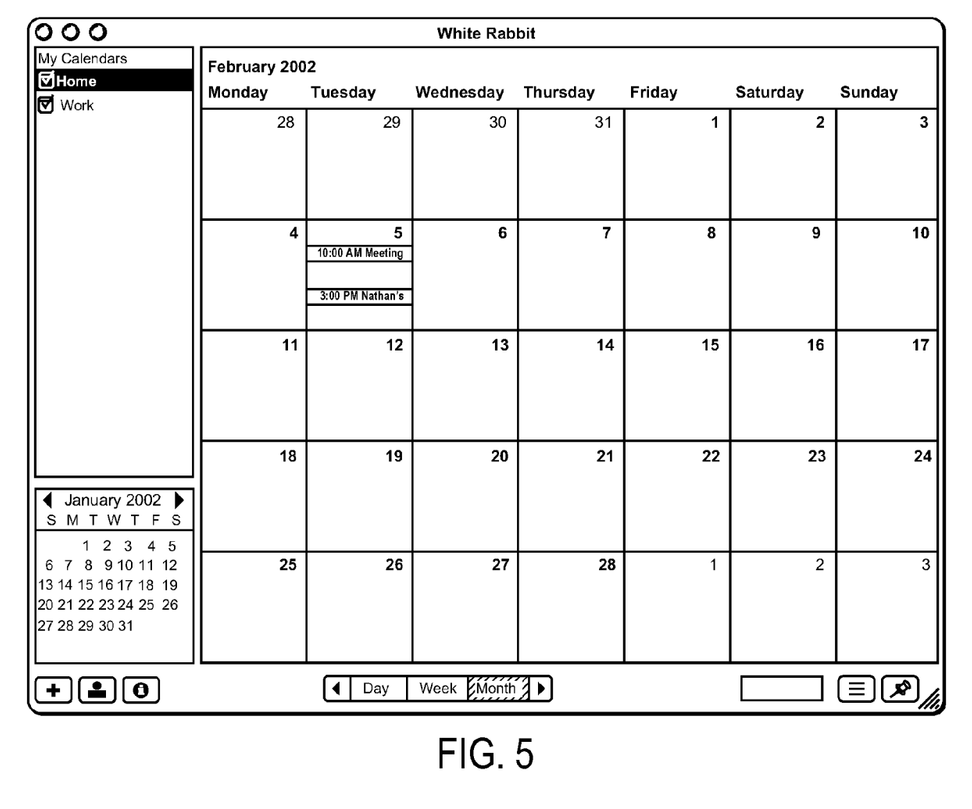
FIG. 5 is a diagram of a user interface according to the present invention illustrating a different data range as the primary date range.

Window 600 comprises a primary date range. In FIGS. 3 and 4, the primary date range comprises a day with a data field for each hour. In FIG. 3, the primary date range is a month. Needless to say, the primary date range may be weekly or daily or another period of time. A selector 1000 in the user interface enables a user to select which primary date range to display.

The primary date range includes a data field for each unit of the primary date range. That is to say, in the daily date range, the data fields are hours, in the weekly date range, the data fields are days or hours, in the monthly date range, the data fields are days or hours and in the yearly date range, the data fields are months, weeks, days or hours. As shown in FIG. 3, the data fields may display sub-fields for each hour of the day when the primary date range is monthly. Similarly, in the yearly date range, each data field may display sub-fields for each day. In the daily date range, the preferred embodiment of the computer program displays only some of the hours available.

Window 800 enables a subsidiary date range to be displayed. In FIGS. 3 and 4, the subsidiary date range is monthly. A marker 1200, enables the day selected in the primary date range to be indicated in the subsidiary date range. For example, Tuesday Feb. 5, 2002 is shown in the primary date range and this day is indicated by the marker in the subsidiary date range which displays February 2002.

The user interface provides a toggle or control interface 1400 for each calendar. The user interface indicates to the user that the toggle is activated when a tick or check mark appears next to the name of the calendar. If a toggle is activated, then the events from the respective calendar are displayed by the user interface, typically by displaying the events in a calendar interface such as a daily or weekly or monthly view. FIG. 4 illustrates two situations for the user interface. One situation has the user interface displaying events from two calendars, namely "Home" and "Work" whereas the other situation has the user interface displaying events from only one calendar, namely "Home". For example, in the first situation in FIG. 4, there is an event occurring at 10 am, namely "Meeting" which is not displayed in the other situation since this event only appears in the calendar "Work" which is not activated.

The present invention thus enables a user to manage all of the required calendars using a computer program having a single user interface and all of the two or more calendars may be calendars for the same user displaying events, meetings, etc. for that user. The user interface significantly enhances the management of the events occurring over a plurality of calendars. Thus, when checking availability of a new event, a user merely needs to activate all of the relevant calendars (leaving the other calendars not activated), and the events in all the relevant (activated) calendars are all displayed and a user can easily confirm whether there is availability. Conversely, when considering just one category of events, a user merely needs to deactivate the redundant calendars and activate only the one relating to the particular category. The user interface thus very efficiently manages the calendars on the one hand by combining all of the calendars and yet allows flexibility to focus on one or a few calendars to minimise confusion and reduce complexity.

FIGS. 6 to 9 illustrate an embodiment of the present invention. In FIGS. 6 to 9, window 800 displays more than one month as the subsidiary date range. Moreover, the marker 1200, indicates a selected week. Window 600 comprises the primary date range of a week with hourly data fields for each day of the week. The user interface indicates a particular day in the primary date range and a detailed marker 1600 in the subsidiary date range indicates the same day. For example, Tuesday 27 Aug. 2002 is highlighted in the primary date range and the detailed marker indicates the same day and this is distinguished from the marker 1200 in the subsidiary date range.

Figure 6:
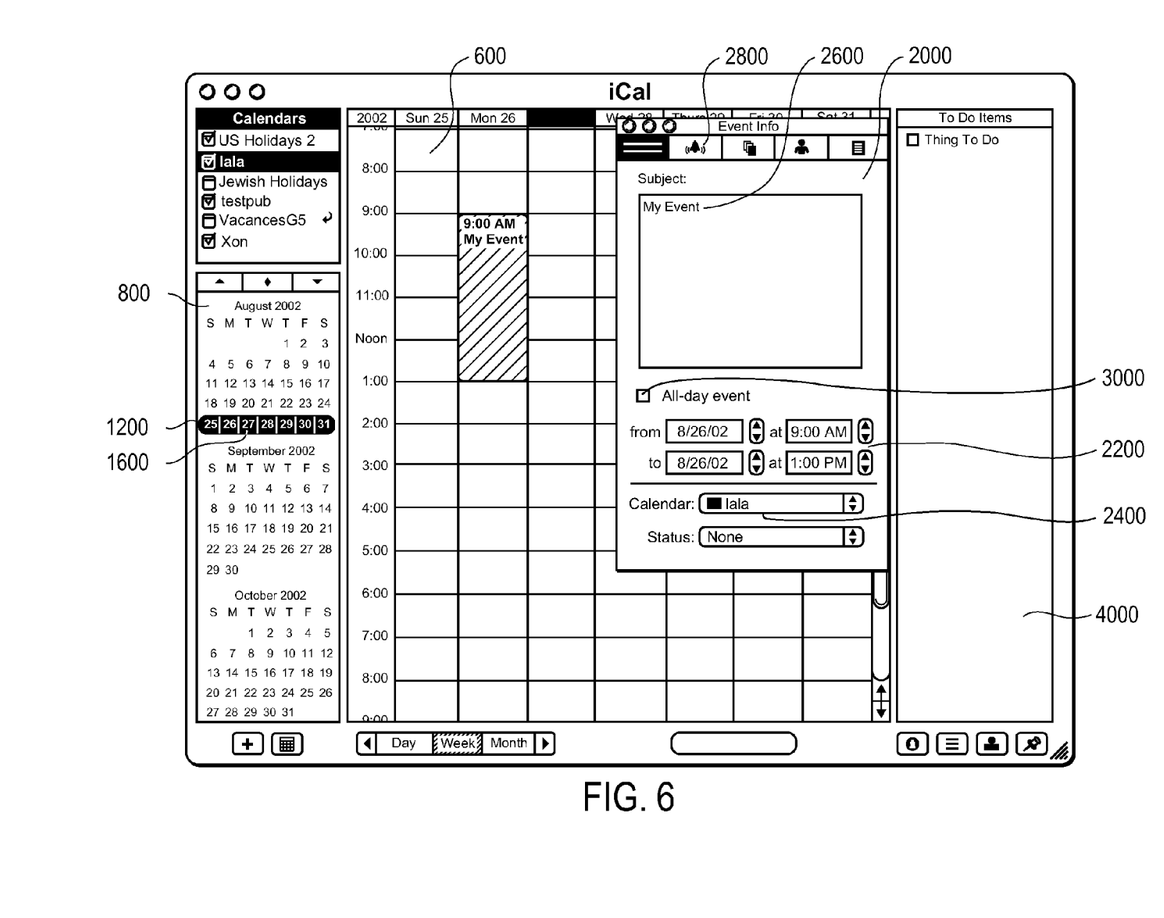
FIG. 6 is a diagram of a user interface according to the present invention illustrating the display of events.
Figure 7:
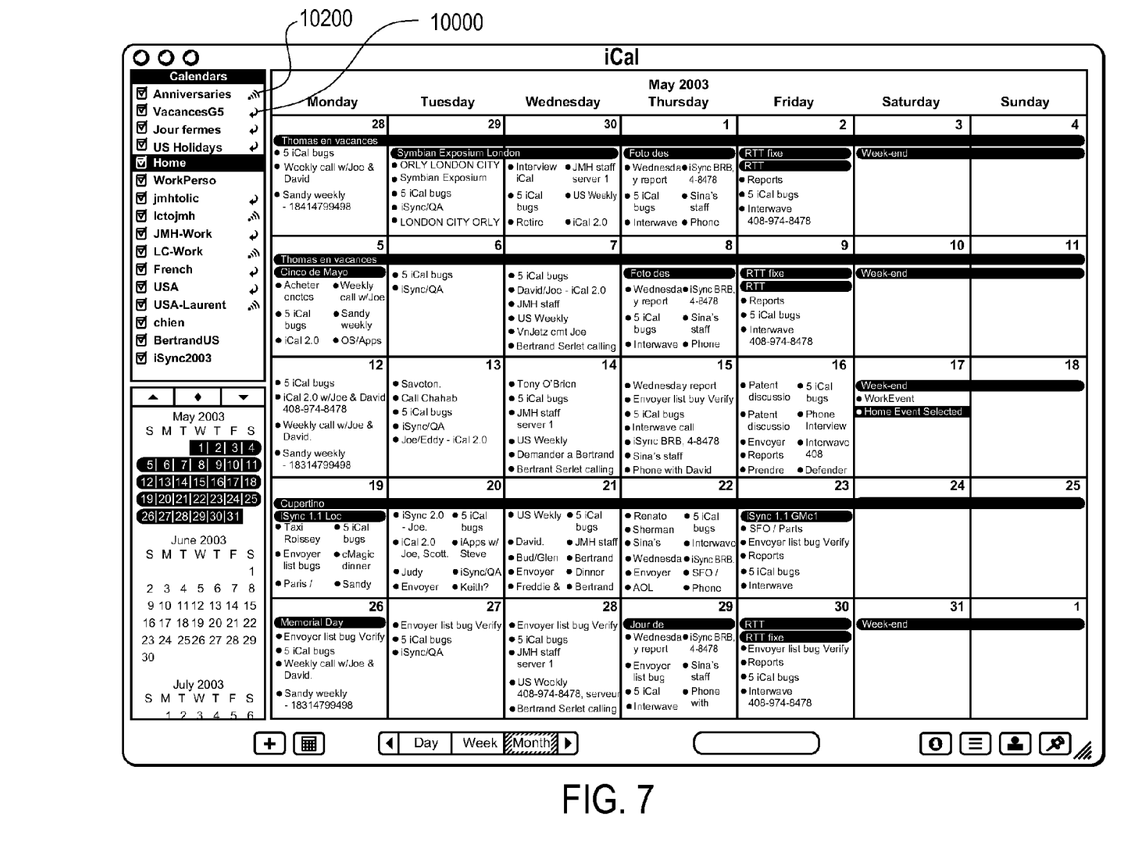
FIG. 7 is a diagram of a user interface according to the present invention illustrating to do items.

FIG. 6 illustrates an event, namely "My Event". The event is displayed as a 2-D shape, namely a rounded rectangle. The 2-D shape has boundaries which are approximately contiguous with the specified duration, namely 9 am to 1 p.m.

In order to minimise confusion, only one of the calendars is selected for editing at any one time. Thus, a user selects a calendar of most importance in the hierarchy of all of the calendars. This is indicated by highlighting in the user interface. For example, as shown in FIG. 6, the calendar "lala" is highlighted, thereby indicating that as the most important calendar.

When a user wishes to add, select, modify or delete an event, the user may highlight the event and double click. An interrogator interface 2000 is activated and displayed. The date of the event and duration are displayed as shown at 2200. Changes can be made using the arrows. The calendar from which the event is taken is also displayed at 2400. The event may be moved from one calendar to another by changing the associated calendar appearing at 2400. The details of the event are displayed at 2600. Not only may the event be changed but also properties associated with the event may be changed. For example, an alarm may be indicated and/or selected at 2800. When the alarm is due, any known computer program alarm may be provided such as an audio or visual announcement. A shortcut 3000 may be activated to set the duration as the whole day or other duration depending upon the primary date range used. Another property is to set the event as recurring. A recurring event may comprise for example Birthdays, anniversaries, regular appointments etc.

The user interface shown in FIG. 6 also includes an additional window 4000. Window 4000 is entitled "To Do items". To do items include those tasks for which a specific time is not required but set for a particular day, week, month or year, depending upon the primary date range selected. In FIG. 6, the primary date range is weekly and the to do items are noted for a particular day. To do items can be displayed such as that shown in FIG. 7. The to do items may be implemented in a "Franklin Covey mode".

Figure 8:
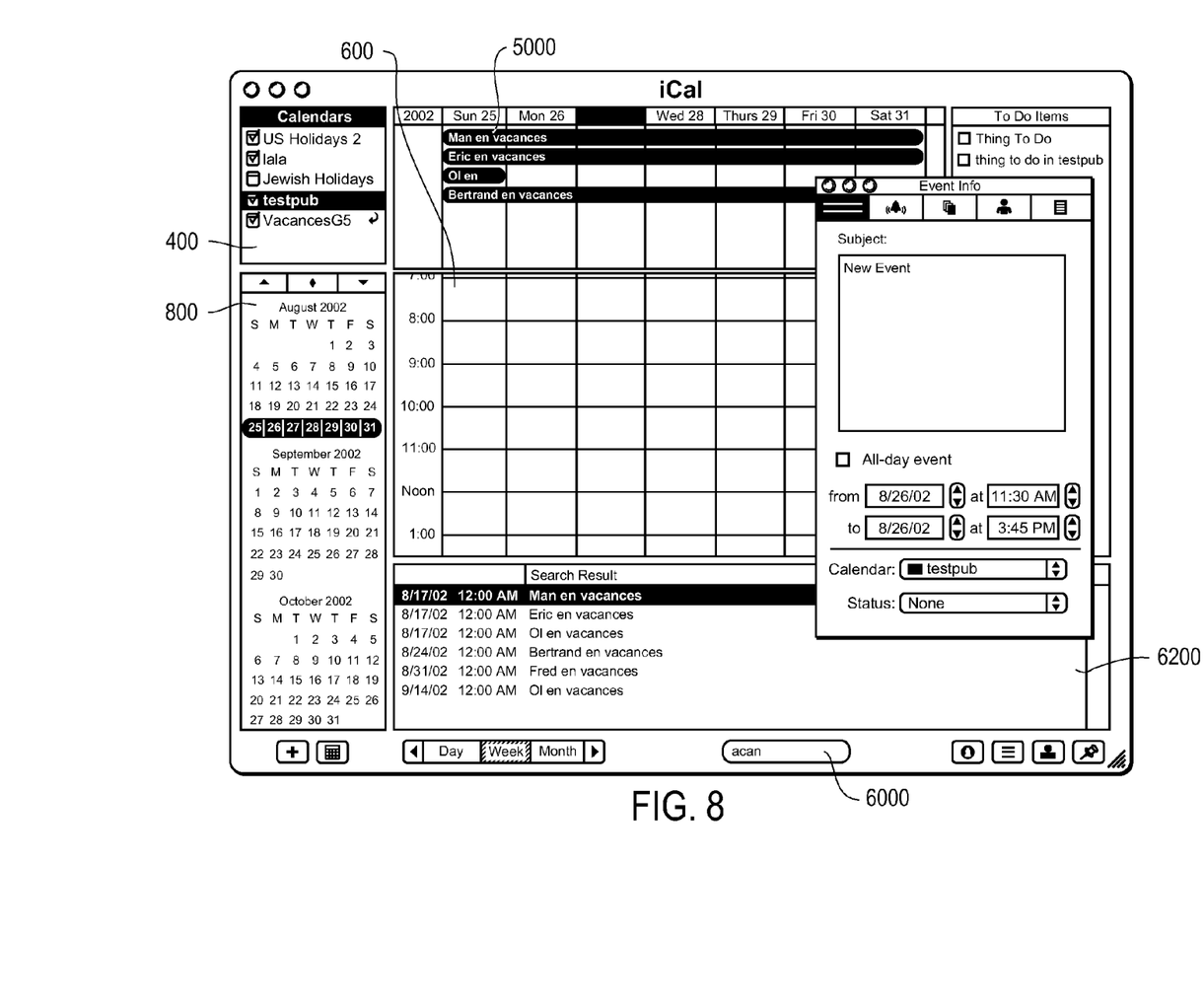
FIG. 8 is a diagram of a user interface according to the present invention illustrating a search result window.

FIG. 8 illustrates a user interface with an additional window 5000. Window 5000 provides another subsidiary date range, in this case weekly. The events occurring in window 5000 are generally of a day long duration. Such a display is particularly useful when displaying user's holidays or national holidays or other events of a day duration such as Birthdays. Those events are indicated by a 2-D rectangular shape with rounded corners at the extremities of the duration. Such events are termed banners. A banner may also be used to display a weekend or holiday period. The computer program is able to display such a banner with rectangular corners at the extremity of the duration when the shortcut 3000 is activated.

The computer program of the present invention also provides for searches to be effected. The searches are facilitated by search interface 6000. A string of characters is entered into the search interface. A search is conducted across selected calendars and the search results are displayed in a search result window 6200. For example in FIG. 8, the search string "acan" was entered and various entries identified and displayed. The search interface also enables each of the events presented thereby to be viewed and/or changed and selecting one of the results in the search interface for changing may produce the interrogator interface as discussed above.

Figure 9:
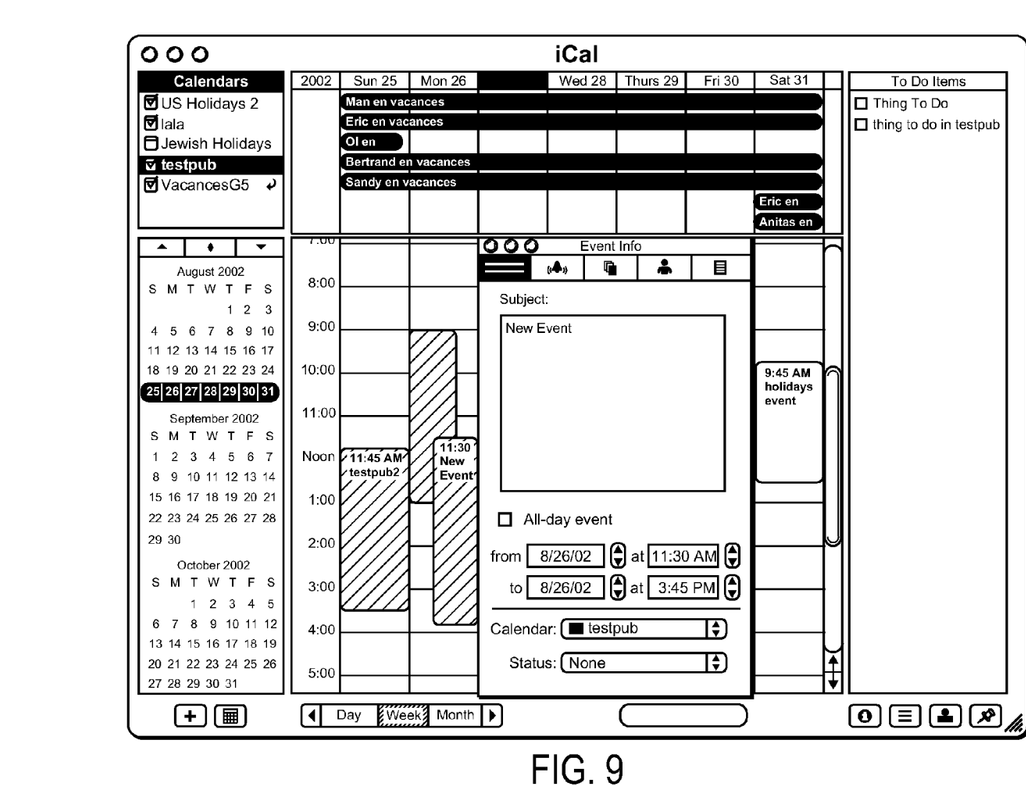
FIG. 9 is a diagram of a user interface according to the present invention illustrating overlapping events.

As discussed above, events from each toggled calendar are displayed by the user interface. FIG. 9 illustrates the user interface whereby several calendars are toggled, namely "US Holidays 2", "lala", "Jewish Holidays", "testpub" and "VacancesG5". The events are shown in the primary date range. It is not uncommon for events to conflict. Thus, a distinguishing feature is provided to distinguish between conflicting events. The distinguishing feature may comprise a different colour, the shape of the event being displayed differently and/or one of the events being translucently displayed. When colour is used, the name of the calendar and each of the events or their shape take the same colour.

Figure 10:
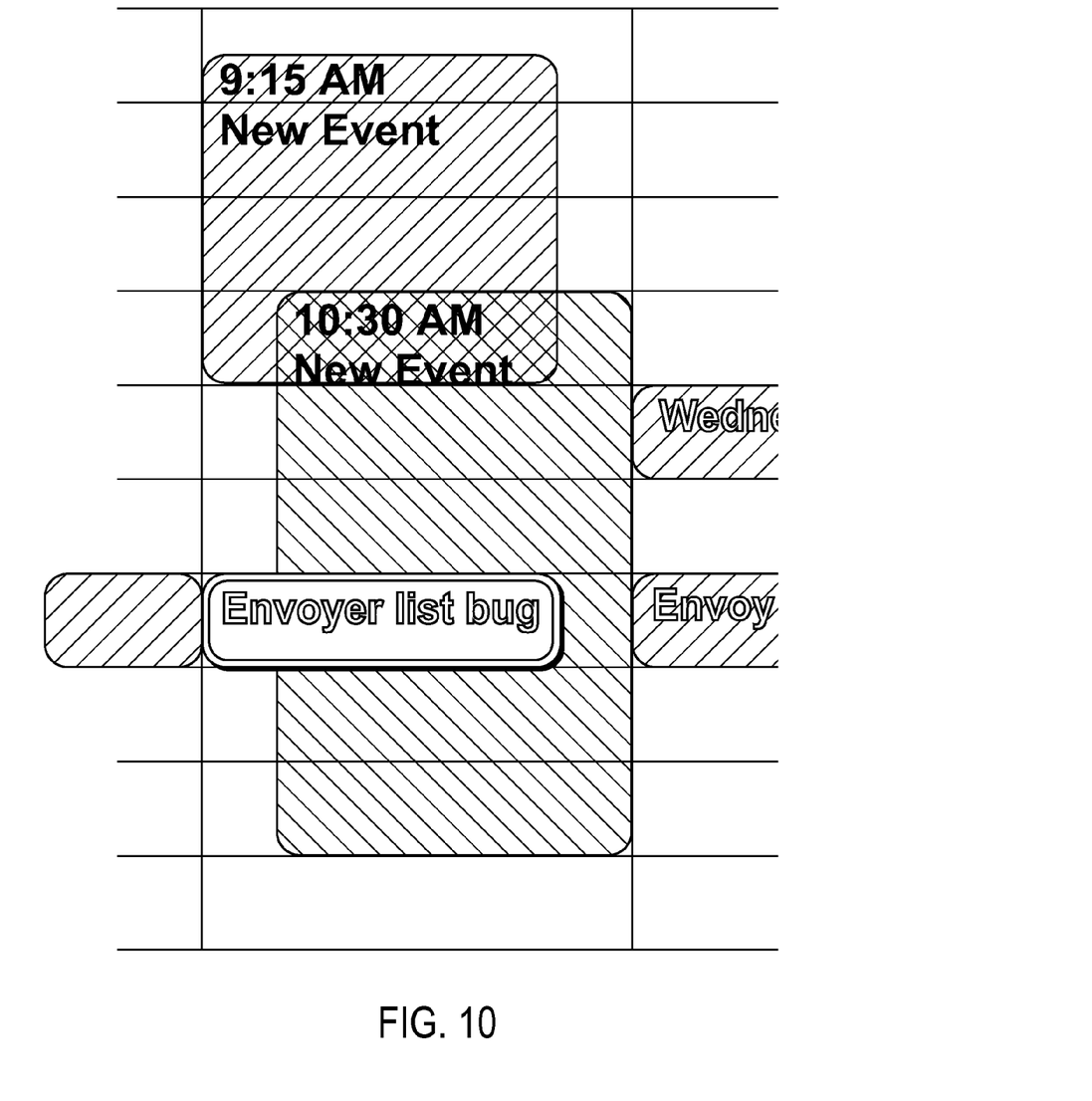
FIG. 10 is a diagram of part of a user interface according to the present invention illustrating said overlapping events in more detail.

In FIG. 9, there are two conflicting events which overlap between 11.30 am and 1 p.m. The events are displayed in a translucent manner and with their shape reduced such that the lateral boundary does not extend the full width of the day data field. FIG. 10 illustrates this in more detail. In this case, there are two conflicting events with the event entitled "New event" at 10.30 am. The other events "New event" at 9.15 am and "envoyer list bug" are reduced in size and aligned with the left perimeter of the day data field whereas the event "New event" at 10.30 am is reduced in size and aligned with the right perimeter of the day data field. Moreover, event "New event" at 1030 am is made translucent so that event "New event" at 9.15 am can be seen there through and event "envoyer list bug" is overlaid.

Figure 11:
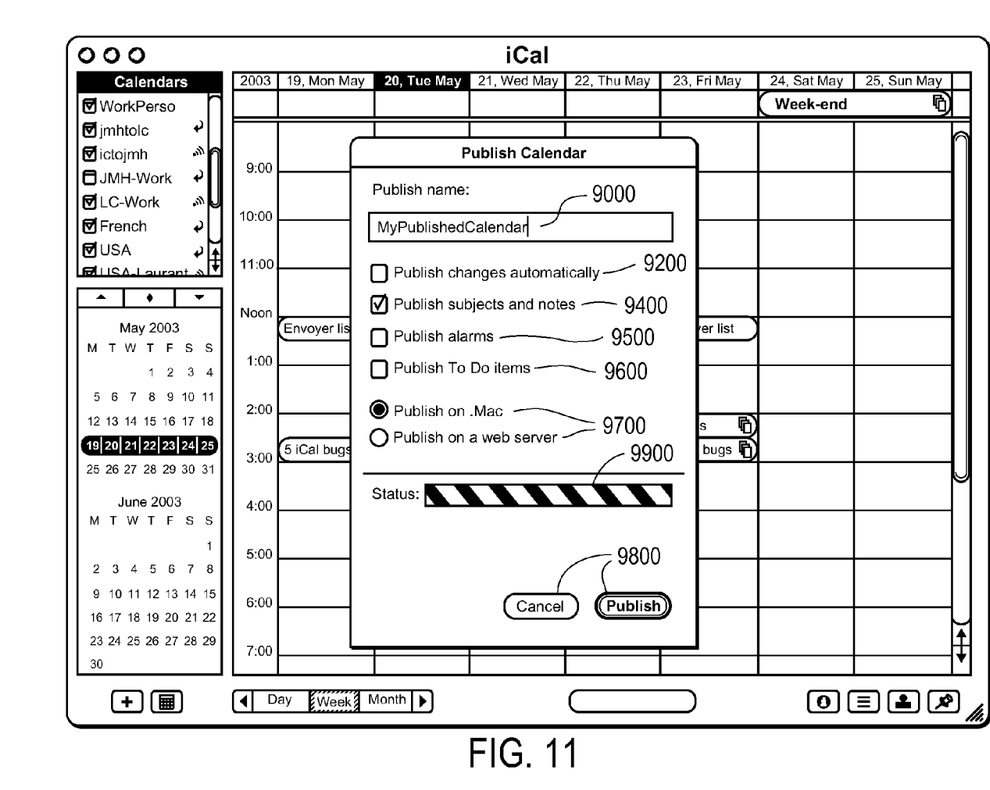
FIG. 11 is a diagram of a publish interface for publishing one of the calendars.

Finally, FIG. 11 illustrates a publish interface for facilitating the publication of the selected calendar. In the publish interface, one of the calendars is selected at 9000. A user may set preferences associated with the selected published calendar. For example, all changes effected on the calendar are published automatically at 9200. All notes and events are included at 9400. Any alarms set can also be included or not in the published calendar at 9500 since these may not be relevant to a subscriber. Similarly any to do items can be included or not in the published calendar at 9600. Finally, the publish interface enables the calendar to be published either over the Internet or on a server at 9700. Confirmation or cancellation can be effected via buttons 9800. Finally, a status of the publication is indicated at 9900.

Two features of embodiments of the present invention are the instant access to data and the natural selection and visualisation of other sources of events. The present invention may contain a large multitude of events, in particular because of its ability to include many calendars within a calendar interface for a user. Thus, it becomes critical for a user to quickly and easily find relevant data in a given context. For example, during work hours, a user must be able to easily find meetings concerning a given project, by selecting only the work calendar and searching for the given project. However, at home, the same user, with the same computer program and user interface must have a way to easily find social details such as the soccer matches for any given team, again through selecting only the relevant calendars and searching for the given team. The user is thus provided with a live textual search system and related navigational facilities.

Embodiments of the present invention thus achieve the objectives of enabling a user to manage all of the required calendars using a computer program having a single user interface. The user interface significantly enhances the management of the events occurring over a plurality of calendars. Thus, when checking availability of a new event, a user merely needs to activate (e.g. "toggle") all of the relevant calendars, whose events are all displayed and a user can easily confirm whether there is availability. Conversely, when considering just one category of events, a user merely needs to deactivate (e.g. "de-toggle") the redundant calendars and activate only the one relating to the particular category. The user interface thus very efficiently manages the calendars on the one hand by combining all of the calendars and yet allows flexibility to focus on one or a few calendars to minimise confusion and reduce complexity.

To enhance the security of data integrity and reduce complexity, it is preferred that data involved in the computer program is always synchronised across various electronic devices. A method of synchronising three or more electronic devices is described in one of our other co-pending applications filed on the same day by the same inventors and entitled "A Method Of Synchronizing Three Or More Electronic Devices And A Computer System For Implementing That Method," U.S. patent application Ser. No. 10/453,051, which application is hereby incorporated herein by reference.

The foregoing description has been given by way of example only and it will be appreciated by a person skilled in the art that modifications can be made without departing from the scope of the present invention.

The invention claimed is:

1. A machine readable medium storing executable computer program instructions which when executed by a data processing system cause the data processing system to perform a method comprising:

receiving a first user input from a first user indicating to publish at least a portion of the first user's calendar, such that the at least a portion of the first user's calendar is available through a network to other users;

receiving a second user input from the first user specifying whether to publish the first user's calendar to the other users with alarms or to publish the first user's calendar to the other users without alarms even though the first user's calendar has alarms;

receiving a third user input from the first user specifying whether to publish the first user's calendar to the other users with notes or to publish the first user's calendar to the other users without notes even though the first user's calendar has notes;

receiving a fourth user input from the first user specifying whether to publish the first user's calendar to the other users with to do items or to publish the first user's calendar to the other users without to do items even though the first user's calendar has to do items;

receiving a fifth user input from the first user specifying whether to automatically publish changes to the first user's calendar to the other users or to not automatically publish changes to the first user's calendar to the other users;

wherein, respective displayed features for separately receiving said first, second, third, fourth and fifth user inputs are simultaneously displayed;

receiving in a display region sixth user input and seventh user input from the first user respectively specifying calendar data of the first user and the first user's calendar to move the calendar data from another different calendar of the first user into the first user's calendar;

transmitting data representing the first user's calendar including the data having been moved and any notes, to do items and changes of the first user's calendar consistent with the third, fourth and fifth user inputs to another data processing system for viewing by a subscriber to the first user's calendar.

2. A machine readable medium as in claim 1 wherein the transmitting causes the at least a portion of the first user's calendar to be published over the Internet so that another user can subscribe to the published version of the first user's calendar.

3. A machine readable medium as in claim 2, the method further comprising:

displaying a list of calendars, wherein the list of calendars comprises at least two calendars and wherein the at least two calendars each contain at least one user-created event created by the first user;

displaying a selection interface for each calendar in the list of calendars, each of the selection interfaces for causing data from a corresponding calendar to be included or excluded from the display of the first user's calendar.

4. A machine readable medium as in claim 3 wherein each selection interface is a toggle for a corresponding calendar, and wherein a calendar's events are displayed in the first user's calendar when its toggle is activated and wherein more than one calendar in the list of calendars can be toggled to an activated state and wherein events contained in all toggled on calendars are displayed concurrently in the first user's calendar.

5. A machine readable medium as in claim 4 wherein deactivating an activated toggle for a first calendar causes events from the first calendar to be removed from the display of the first user's calendar.

6. A machine readable medium as in claim 5, the method further comprising:

receiving a search from a search interface and performing a search of selected calendars in the list of calendars.

7. A machine readable medium as in claim 3 wherein the list of calendars comprise a first calendar and a second calendar for the same user.

8. A machine readable medium as in claim 7 wherein the first calendar is named "Home" and the second calendar is named "Work."

9. A machine readable medium as in claim 3, the method further comprising:

causing a notification of a change in the first user's calendar to be transmitted to a subscriber of the first user's calendar;

receiving a reply to the notification.

10. A machine implemented method comprising:

receiving a first user input from a first user indicating to publish at least a portion of the first user's calendar, such that the at least a portion of the first user's calendar is available through a network to other users;

receiving a second user input from the first user specifying whether to publish the first user's calendar to the other users with alarms or to publish the first user's calendar to the other users without alarms even though the first user's calendar has alarms;

receiving a third user input from the first user specifying whether to publish the first user's calendar to the other users with notes or to publish the first user's calendar to the other users without notes even though the first user's calendar has notes;

receiving a fourth user input from the first user specifying whether to publish the first user's calendar to the other users with to do items or to publish the first user's calendar to the other users without to do items even though the first user's calendar has to do items;

receiving a fifth user input from the first user specifying whether to automatically publish changes to the first user's calendar to the other users or to not automatically publish changes to the first user's calendar to the other users;

wherein, respective displayed features for separately receiving said first, second, third, fourth and fifth user inputs are simultaneously displayed;

receiving in a display region sixth user input and seventh user input from the first user respectively specifying calendar data of the first user and the first user's calendar to move the calendar data from another different calendar of the first user into the first user's calendar;

transmitting data representing the first user's calendar including the data having been moved and any notes, to do items and changes of the first user's calendar consistent with the third, fourth and fifth user inputs to another data processing system for viewing by a subscriber to the first user's calendar.

11. A method as in claim 10 wherein the transmitting causes the at least a portion of the first user's calendar to be published over the Internet so that another user can subscribe to the published version of the first user's calendar.

12. A method as in claim 11, the method further comprising:

displaying a list of calendars, wherein the list of calendars comprises at least two calendars and wherein the at least two calendars each contain at least one user-created event created by the first user;

displaying a selection interface for each calendar in the list of calendars, each of the selection interfaces for causing data from a corresponding calendar to be included or excluded from the display of the first user's calendar.

13. A method as in claim 12 wherein each selection interface is a toggle for a corresponding calendar, and wherein a calendar's events are displayed in the first user's calendar when its toggle is activated and wherein more than one calendar in the list of calendars can be toggled to an activated state and wherein events contained in all toggled on calendars are displayed concurrently in the first user's calendar.

14. A method as in claim 13 wherein deactivating an activated toggle for a first calendar causes events from the first calendar to be removed from the display of the first user's calendar.

15. A method as in claim 14, the method further comprising:

receiving a search from a search interface and performing a search of selected calendars in the list of calendars.

16. A method as in claim 12 wherein the list of calendars comprise a first calendar and a second calendar for the same user.

17. A method as in claim 16 wherein the first calendar is named "Home" and the second calendar is named "Work."

18. A method as in claim 12, the method further comprising:

causing a notification of a change in the first user's calendar to be transmitted to a subscriber of the first user's calendar;

receiving a reply to the notification.

19. An electronic data processing system comprising a machine readable medium storing executable computer program instructions which when executed by the electronic data processing system cause the electronic data processing system to perform a method comprising:

receiving a first user input from a first user indicating to publish at least a portion of the first user's calendar, such that the at least a portion of the first user's calendar is available through a network to other users;

receiving a second user input from the first user specifying whether to publish the first user's calendar to the other users with alarms or to publish the first user's calendar to the other users without alarms even though the first user's calendar has alarms;

receiving a third user input from the first user specifying whether to publish the first user's calendar to the other users with notes or to publish the first user's calendar to the other users without notes even though the first user's calendar has notes;

receiving a fourth user input from the first user specifying whether to publish the first user's calendar to the other users with to do items or to publish the first user's calendar to the other users without to do items even though the first user's calendar has to do items;

receiving a fifth user input from the first user specifying whether to automatically publish changes to the first user's calendar to the other users or to not automatically publish changes to the first user's calendar to the other users;

wherein, respective displayed features for separately receiving said first, second, third, fourth and fifth user inputs are simultaneously displayed;

receiving in a display region sixth user input and seventh user input from the first user respectively specifying calendar data of the first user and the first user's calendar to move the calendar data from another different calendar of the first user into the first user's calendar;

transmitting data representing the first user's calendar including the data having been moved and any notes, to do items and changes of the first user's calendar consistent with the third, fourth and fifth user inputs to another data processing system for viewing by a subscriber to the first user's calendar.

20. A electronic data processing system as in claim 19 wherein the transmitting causes the at least a portion of the first user's calendar to be published over the Internet so that another user can subscribe to the published version of the first user's calendar.

21. A electronic data processing system as in claim 20, the method further comprising:

displaying a list of calendars, wherein the list of calendars comprises at least two calendars and wherein the at least two calendars each contain at least one user-created event created by the first user;

displaying a selection interface for each calendar in the list of calendars, each of the selection interfaces for causing data from a corresponding calendar to be included or excluded from the display of the first user's calendar.

22. A electronic data processing system as in claim 21 wherein each selection interface is a toggle for a corresponding calendar, and wherein a calendar's events are displayed in the first user's calendar when its toggle is activated and wherein more than one calendar in the list of calendars can be toggled to an activated state and wherein events contained in all toggled on calendars are displayed concurrently in the first user's calendar.

23. A electronic data processing system as in claim 22 wherein deactivating an activated toggle for a first calendar causes events from the first calendar to be removed from the display of the first user's calendar.

24. A electronic data processing system as in claim 23, the method further comprising:

receiving a search from a search interface and performing a search of selected calendars in the list of calendars.

25. A electronic data processing system as in claim 21 wherein the list of calendars comprise a first calendar and a second calendar for the same user.

26. A electronic data processing system as in claim 25 wherein the first calendar is named "Home" and the second calendar is named "Work."

27. A electronic data processing system as in claim 21, the method further comprising:

causing a notification of a change in the first user's calendar to be transmitted to a subscriber of the first user's calendar;

receiving a reply to the notification.

* * * * *

UNITED STATES PATENT AND TRADEMARK OFFICE
CERTIFICATE OF CORRECTION

| | |
|---|---|
| PATENT NO. | : 7,814,055 B2 |
| APPLICATION NO. | : 10/453193 |
| DATED | : October 12, 2010 |
| INVENTOR(S) | : Jean-Marie Hullot et al. |

It is certified that error appears in the above-identified patent and that said Letters Patent is hereby corrected as shown below:

On the face page, in field (75), in "Inventors", in column 1, line 1, delete "Boucival (FR);" and insert -- Bougival (FR); --, therefor.

Signed and Sealed this
Twenty-second Day of November, 2011

David J. Kappos
*Director of the United States Patent and Trademark Office*